US010639971B2

(12) United States Patent
Hoggarth et al.

(10) Patent No.: US 10,639,971 B2
(45) Date of Patent: May 5, 2020

(54) VEHICLE FURNITURE SYSTEM

(71) Applicant: Ford Global Technologies, LLC, Dearborn, MI (US)

(72) Inventors: Marcus Hoggarth, Hertfordshire (GB); Stephen De Saulles, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 16/046,170

(22) Filed: Jul. 26, 2018

(65) Prior Publication Data
US 2019/0061491 A1 Feb. 28, 2019

(30) Foreign Application Priority Data

Aug. 24, 2017 (GB) .................................. 1713619.3

(51) Int. Cl.
*B60J 7/08* (2006.01)
*B60J 5/04* (2006.01)
*B60N 3/00* (2006.01)

(52) U.S. Cl.
CPC ............ *B60J 5/0493* (2013.01); *B60N 3/001* (2013.01)

(58) Field of Classification Search
CPC ................ A47B 88/493; A47B 88/487; A47B 2210/0059; A47B 2210/0013; E05Y 2900/20; C09D 133/064; C08L 2666/28; C08L 2666/04; C08L 2666/14; B60R 9/048
See application file for complete search history.

(56) References Cited

U.S. PATENT DOCUMENTS

| | | | | |
|---|---|---|---|---|
| 1,503,690 A | * | 8/1924 | Kroschel ................. | A47B 5/04 108/33 |
| 1,511,925 A | * | 10/1924 | Wasmuth ................. | A47B 5/06 108/167 |
| 1,699,496 A | * | 1/1929 | Wasmuth ................. | A47B 5/06 108/40 |
| 1,796,002 A | * | 3/1931 | Covell .................... | A47B 5/04 108/37 |
| 1,809,866 A | * | 6/1931 | Riesche .................. | A47B 5/04 108/38 |
| 2,619,395 A | * | 11/1952 | Kent ...................... | B60N 3/004 108/38 |
| 2,643,420 A | * | 6/1953 | Schwartz ............... | E05F 1/1058 49/458 |
| 2,932,544 A | * | 4/1960 | Lambert ................. | B60N 3/004 297/163 |

(Continued)

FOREIGN PATENT DOCUMENTS

| | | |
|---|---|---|
| CN | 103223888 A | 7/2013 |
| DE | 19936597 A1 | 2/2001 |

(Continued)

*Primary Examiner* — Kiran B Patel
(74) *Attorney, Agent, or Firm* — David Coppiellie; Price Heneveld LLP

(57) ABSTRACT

A vehicle furniture system having an article of furniture and a carriage configured to carry the article of furniture between first and second positions within a body portion of a vehicle when the carriage is coupled to the body portion of the vehicle, the vehicle furniture system comprising a first actuator configured to deploy the article of furniture from the carriage when the carriage is in at least one of the first and second positions.

20 Claims, 4 Drawing Sheets

(56) References Cited

U.S. PATENT DOCUMENTS

| | | | | |
|---|---|---|---|---|
| 2,963,078 A * | 12/1960 | Ferrelle | B60N 3/004 297/146 |
| 3,164,109 A * | 1/1965 | Atkinson | A47B 31/06 108/44 |
| 3,207,567 A * | 9/1965 | Brady | B60N 3/005 312/235.8 |
| 3,391,960 A * | 7/1968 | Megargle | A47B 23/04 296/24.3 |
| 3,606,846 A * | 9/1971 | Andrews et al. | A47B 3/0916 108/132 |
| 4,313,385 A * | 2/1982 | Fitzgerald | A47B 5/06 108/38 |
| 4,620,741 A * | 11/1986 | Hanemaayer | B60P 3/36 108/150 |
| 4,829,910 A * | 5/1989 | Lirette | A47B 3/00 108/35 |
| 5,443,018 A * | 8/1995 | Cromwell | B60N 3/004 108/44 |
| 5,485,793 A * | 1/1996 | Crowell | A47B 23/04 108/44 |
| 5,527,084 A * | 6/1996 | Scherf | B60R 21/0428 296/153 |
| 5,669,314 A * | 9/1997 | Grant | A47B 5/00 108/20 |
| 5,673,628 A * | 10/1997 | Boos | B60N 3/001 108/138 |
| 5,701,826 A * | 12/1997 | Dodgen | A47B 31/06 108/139 |
| 5,771,813 A * | 6/1998 | Jackson | A47B 3/0912 108/50.11 |
| 5,947,033 A * | 9/1999 | Lombardo | B60N 3/004 108/44 |
| 6,055,911 A * | 5/2000 | Krenzer | B60N 3/004 108/44 |
| 6,394,001 B1 * | 5/2002 | Giesey | B60N 3/002 108/44 |
| 7,210,722 B2 * | 5/2007 | Bernstein | B62D 33/0612 296/190.02 |
| 7,399,031 B2 * | 7/2008 | Gardner | B60P 3/39 297/1 |
| 7,464,652 B2 * | 12/2008 | Hauck | A47B 5/04 108/42 |
| D603,182 S * | 11/2009 | Smith | D6/406.2 |
| 7,651,160 B2 * | 1/2010 | Okumura | B60N 3/004 108/42 |
| 7,721,657 B2 * | 5/2010 | Carstensen | A47B 5/006 108/134 |
| 7,810,439 B2 * | 10/2010 | Bless | B60R 9/06 108/115 |
| 7,963,231 B2 * | 6/2011 | Osborne | A47B 5/006 108/40 |
| 8,113,128 B2 * | 2/2012 | Lee | A47B 5/06 108/42 |
| 8,205,563 B2 * | 6/2012 | St. Louis | B64D 11/00 108/40 |
| 8,448,581 B2 * | 5/2013 | Hanna | B64D 11/06 108/137 |
| 8,763,537 B2 * | 7/2014 | Ng | A47B 5/006 108/35 |
| D719,495 S * | 12/2014 | Burak | D12/195 |
| 9,146,584 B2 * | 9/2015 | Bowles | G06F 1/1613 |
| 9,295,325 B2 * | 3/2016 | Luebke | A47B 13/081 |
| 9,527,456 B2 * | 12/2016 | Ackeret | B60N 3/002 |
| 9,770,097 B2 * | 9/2017 | Ehrreich | A47B 5/04 |
| 10,427,577 B2 * | 10/2019 | Sequi | B60N 3/002 |
| 2003/0188672 A1 * | 10/2003 | Parent | A47B 5/006 108/134 |
| 2005/0184546 A1 | 8/2005 | Kunz et al. | |
| 2006/0266779 A1 * | 11/2006 | Mozer | B60N 3/007 224/543 |
| 2009/0293774 A1 * | 12/2009 | Cheung | A47B 5/06 108/44 |
| 2010/0109381 A1 * | 5/2010 | Plavetich | B60R 9/00 296/193.01 |
| 2014/0300148 A1 | 10/2014 | Frost et al. | |
| 2015/0217662 A1 | 8/2015 | Tone et al. | |
| 2016/0152163 A1 | 6/2016 | Strasdat et al. | |
| 2017/0112274 A1 * | 4/2017 | De Saulles | A47B 13/16 |
| 2017/0181536 A1 * | 6/2017 | De Saulles | A47B 3/00 |
| 2019/0232844 A1 * | 8/2019 | Hoggarth | B60N 3/001 |

FOREIGN PATENT DOCUMENTS

DE 202014003888 U1 8/2014
GB 2543774 A 5/2017

* cited by examiner

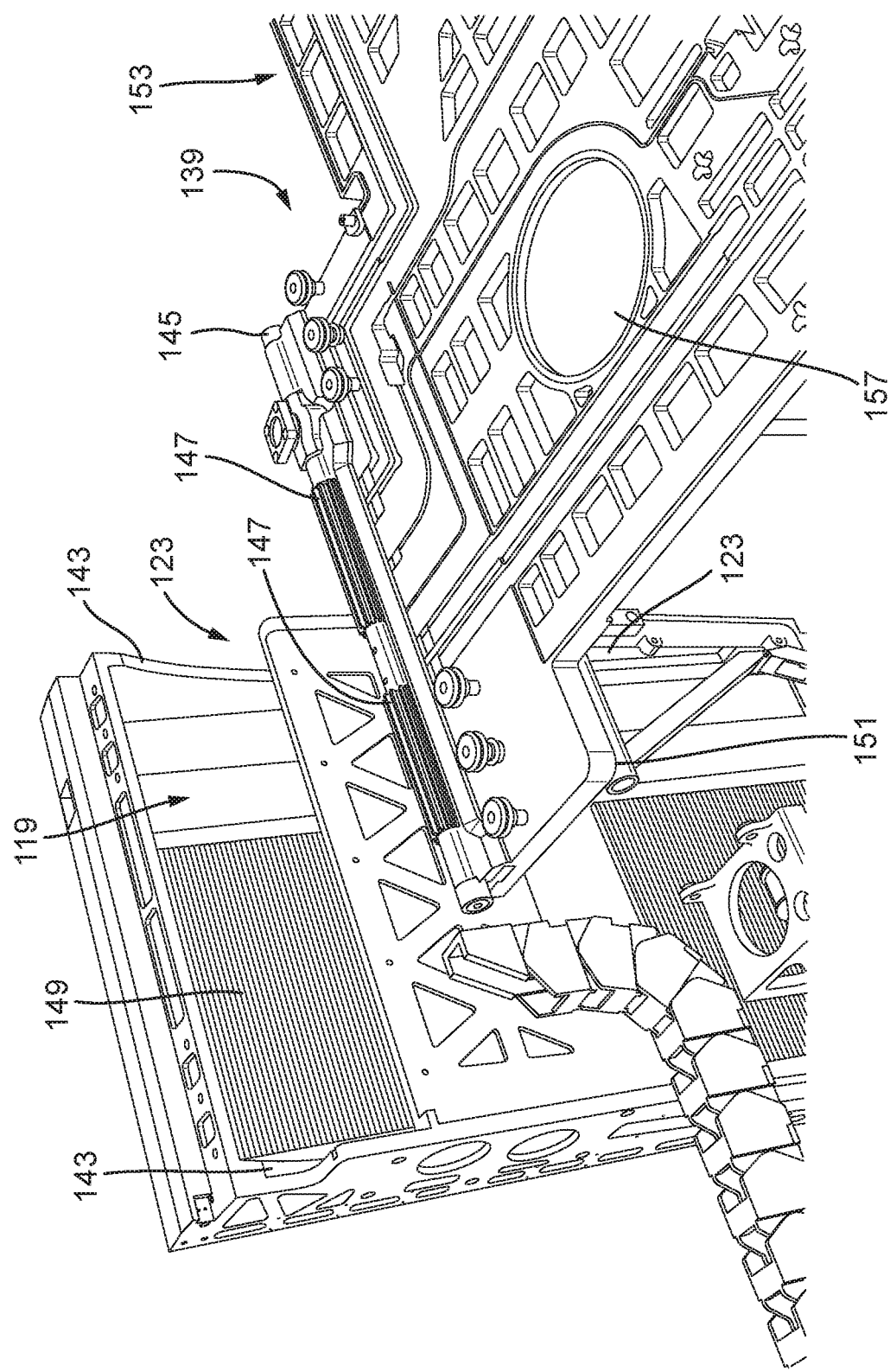

VEHICLE FURNITURE SYSTEM

FIELD OF THE INVENTION

The present invention generally relates to a vehicle furniture system, and more particularly relates to a vehicle furniture system having a table that is deployable from a door of a vehicle.

BACKGROUND OF THE INVENTION

A vehicle, such as a car or a truck, typically has one or more articles of vehicle furniture, such as a table and seats, in the passenger compartment of the vehicle. In some vehicles, the vehicle furniture may be configured so that a passenger can stow the vehicle furniture when not in use. For example, the vehicle furniture may be configured to fold against a load space floor, and/or another article of vehicle furniture. However, an automotive designer may be restricted when designing stowable vehicle furniture, as a result of the seating arrangement in the passenger compartment, and/or the layout of the vehicle chassis.

With the advent of electric and/or autonomous vehicles, the automotive designer may be less restricted in the design of the passenger compartment. As a result, the seating arrangement and the placement of vehicle furniture in a modern vehicle may be different from that of a conventional vehicle. Furthermore, the seating arrangement in a modern vehicle may be reconfigurable depending on a passenger's requirements for a particular journey. It is desirable, therefore, to provide vehicle furniture that may be more conveniently stowed when not in use, and that can be positioned depending on the seating arrangement of the vehicle.

SUMMARY OF THE INVENTION

According to an aspect of the present disclosure, a vehicle furniture system is provided having an article of furniture, e.g., a table, and a carriage configured to carry the article of furniture between first and second positions within a body portion, such as a door of a vehicle, when the carriage is coupled to the body portion of the vehicle. The vehicle furniture system comprises a first actuator configured to deploy the article of furniture from the carriage when the carriage is in at least one of the first and second positions.

The vehicle furniture system may be configured to deploy the article of furniture from the carriage only when the carriage is in one of the first and second positions, depending on the configuration of the vehicle. The first position may be a stowed position, for example a position where the article is disposed within the body portion of the vehicle and is not ready to be deployed, such as a result of the position/orientation of the carriage relative to the portion of the vehicle. The second position may be a launch position, for example a position where the article is disposed within the body portion of the vehicle and is ready to be deployed, such as a result of the position/orientation of the carriage relative to the portion of the vehicle.

The first actuator may be a vehicle furniture actuator, such as a table actuator. The actuator may be an electric, hydraulic and/or pneumatic actuator. The actuator may comprise a worm drive.

The carriage may comprise a ramped surface configured to direct the article of furniture as it deploys from the carriage. The first actuator may cause the article of furniture to engage the ramped surface. The ramped surface may be configured to direct the article of furniture into a passenger compartment of the vehicle. The ramped surface may be configured to cause the article of furniture to move towards a horizontal plane of the vehicle, particularly when the vehicle is on level ground.

The carriage and the article of furniture may be moveably, e.g., slidably and/or rotationally, coupled such that movement of the article of furniture relative to the carriage causes the article of furniture to engage the ramped surface. The vehicle furniture system may comprise a first geared coupling between the article of furniture and the carriage, e.g., a body portion of the carriage. The vehicle furniture system may comprise a second geared coupling between the article of furniture and the first actuator. The second geared coupling may comprise a worm drive mechanism.

The vehicle furniture system may comprise a second actuator, such as a carriage actuator, configured to move the carriage between first and second positions within a body portion of a vehicle. The vehicle furniture system may comprise a third geared coupling between the carriage and the second actuator. The third geared coupling may comprise a worm drive mechanism.

The vehicle furniture system may comprise a third actuator configured to adjust the orientation of the article of furniture when deployed from the body portion of the vehicle. The vehicle furniture system may comprise a control system configured to determine the angular orientation of the article of furniture when deployed from the body portion of the vehicle. At least one of the first actuator and the third actuator may be configured to adjust the angular orientation of the article of furniture when it is determined that the article of furniture is not level.

The body portion of the vehicle may comprise at least one vehicle door, such as a first door and a second door. The first door may be a front door of the vehicle. The second door may be a rear door of the vehicle. The carriage may be configured to move within the at least one door, e.g., within a cavity defined by an outer skin of the at least one door and at least one door panel. The at least one door, such as the first door, may be configured to house the article of furniture when the carriage is in the first position. The at least one door, such as the first door and the second door, may be configured to house the article of furniture when the carriage is in the second position. Where the body portion of the vehicle comprises a plurality of doors, the plurality of doors may cooperate to house the article of furniture when the carriage is in the second position. For example, a front door of a vehicle and a rear door of the vehicle may cooperate to close an opening in the vehicle body. When the front and rear doors are closed, the vehicle furniture system may be configured to move the article of furniture to a position where the article of furniture is disposed partially within a cavity of the front door and partially within a cavity of the rear door, such as when the carriage is in the second position.

The at least one door may comprise a slot configured to receive the article of furniture when the article of furniture is in an at least partially deployed state. For example, the outer skin of the at least one door and/or the door panel of the at least one door may comprise a slot though which the article of furniture may pass. The first actuator may cause the article of furniture may pass through the slot. Where the body portion of the vehicle comprises a plurality of doors, a first door and a second door may each comprise a slot. The slot of the first door and the slot of the second door may cooperate to receive the article of furniture when the carriage is in the second position and the article of furniture is in an at least partially deployed state. The slot may comprise a cover, e.g., a retractable cover, configured to close the opening of the slot when the article of furniture is stowed within the body portion of the vehicle.

The vehicle furniture system may be configured to cause the article of furniture to extend across an interface between the first and second doors when the carriage is in the second position and the article of furniture is in an at least partially deployed state.

The vehicle furniture system may be configured to allow the at least one door to be opened and closed when the article of furniture is in a deployed state. For example, the vehicle furniture system may be configured to allow a rear door of the vehicle to be opened and closed when the article of furniture is in a deployed state.

The vehicle furniture system may comprise a support member configured to at least partially support the article of furniture when in a deployed state. The support member may be coupled to the carriage. The support member may be deployable from the article of furniture. The support member may be deployable from the body portion of the vehicle.

The article of furniture may be movable between a contracted state and an expanded state when the article of furniture is in a deployed state. For example, where the article of furniture comprises a table, the table may comprise a table top movably coupled to a table support structure.

The article of furniture may be a seat. A vehicle may be provided comprising one or more of the above mentioned vehicle furniture systems.

According to another aspect of the present disclosure there is provided a vehicle having a body portion, an article of furniture and a carriage configured to carry the article of furniture between a stowed position and a launch position within the body portion, particularly when the carriage is coupled to the body portion. The vehicle further comprises a first actuator configured to deploy the article of furniture from the carriage when the carriage is in the launch position. The vehicle may be configured to prevent the deployment of the article of furniture when the article of furniture is in the stowed position.

According to a further aspect of the present disclosure there is provided a method of operating a vehicle furniture system having a article of furniture and a carriage configured to carry the article of furniture between first and second positions within a body portion of a vehicle when the carriage is coupled to the body portion of the vehicle. The carriage comprising a first actuator configured to deploy the article of furniture from the body portion when the carriage is in at least one of the first and second positions. The method comprises moving the carriage to one of the first position and the second position within the body portion of a vehicle, and deploying the article of furniture from the body portion.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a partial perspective view of the vehicle furniture system.

DETAILED DESCRIPTION OF THE PREFERRED EMBODIMENTS

Figure 1A:
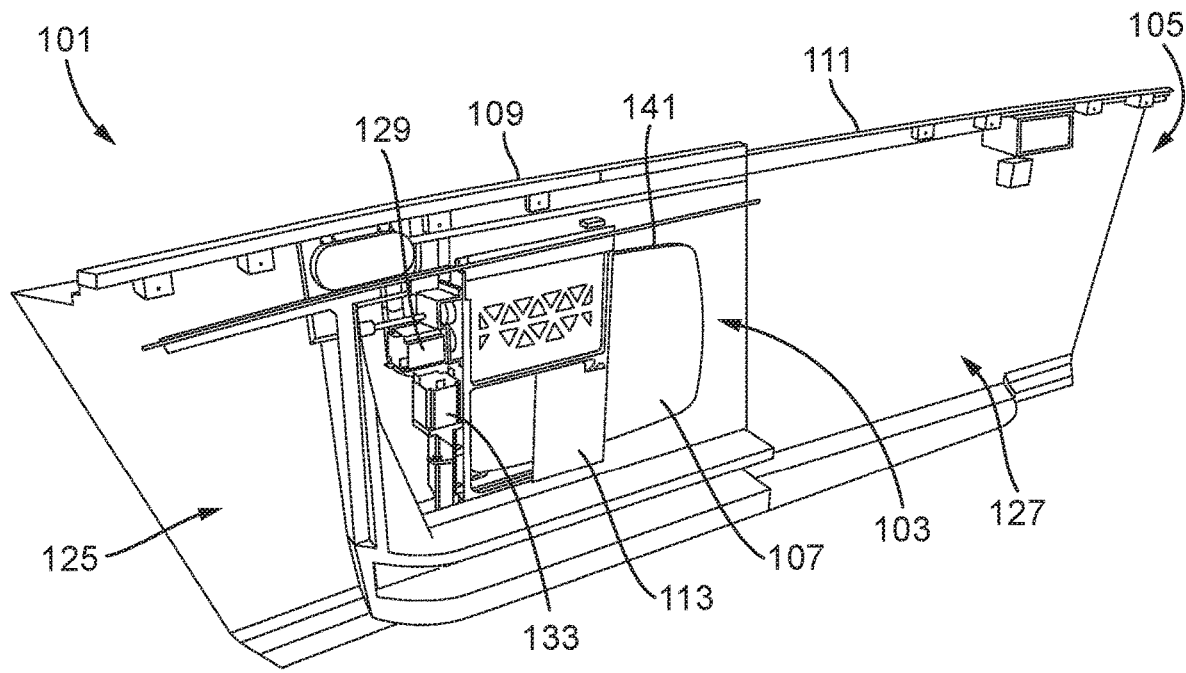
FIG. 1a is a perspective view of a vehicle furniture system shown in a fully stowed state, according to one embodiment.

The present disclosure provides a vehicle furniture system 101 having an article of vehicle furniture 103 that is deployable from a body portion 105 of a vehicle. The vehicle may be any type of vehicle, such a car, a van, a truck, a train, a marine vessel or an aircraft. In the context of the present disclosure, the term "vehicle furniture" is understood to mean any appropriate furniture that can be used to make the interior and/or exterior of the vehicle suitable for being occupied by an individual, and/or used for a particular purpose, such as storage. For example, the vehicle furniture maybe a table, a desk, a seat, a bench, or any other supporting structure.

In the arrangement shown in FIGS. 1a-1e, the article of vehicle furniture 103 (which will be referred to in the following description as simply the vehicle furniture) is a table 107, and the body portion 105 of the vehicle comprises a first vehicle door 109 and a second vehicle door 111. However, the body portion 105 of the vehicle may be any appropriate part of the vehicle. For example, the body portion 105 may comprise at least part of a door, a wall, a bulkhead, a roof and/or a floor of the vehicle.

In the arrangement shown in FIGS. 1a-1e, the first and second vehicle doors 109 are 111 are configured to open away from each other. For example, the first door 109 may be coupled to the vehicle body at one side of an opening in the vehicle body, and the second door 111 may be coupled to the vehicle body at an opposite side of the opening in the vehicle body, such that the outer edges of the doors 109, 111 meet against each other towards the center of the opening when the doors 109, 111 are in a closed position.

The table 107 is mounted to a carriage 113, which is configured to carry the table 107 into one or more required positions. For example, the carriage 113 may comprise a housing 115 that is mounted on a plurality of rails 117 fixed to the body portion 105 of the vehicle, so that the carriage 113 is able to slide relative to the body portion. In the arrangement shown in FIGS. 1a-1e, the rails 117 are provided against an inner surface of an outer skin of the door 109, so that upon assembling a door panel (not shown) to the door 109, the carriage 103 and the rails 117 are disposed within the door 109. In this manner, the carriage 113 is able to slide within, e.g., inside of, the body portion 105.

The carriage 113 is slidable between a first position, as shown in FIG. 1a, and a second position, as shown in FIGS. 1b-1e. When the carriage 113 is in the first position it is located towards one side of the door 109, and when the carriage is in the second position it is located towards another side of the door 109. However, the vehicle furniture system 101 may be configured to allow the carriage 113 to move in any appropriate manner.

The carriage 113 comprises an opening 119 configured to receive the table 107. In the arrangement shown in FIGS. 1a-1e, the opening 119 is provided towards a top edge of the carriage 113 so that the table 107 may be received into the carriage 113 in a substantially vertical manner, with respect to the vehicle body when the vehicle is on level ground. Additionally or alternatively, the carriage 113 may be configured to receive the table 107 in a substantially horizontal direction, and/or in any appropriate manner depending on the configuration of the vehicle furniture 103 and/or the body portion of the vehicle.

In the arrangement shown in FIGS. 1a-1e, the carriage 113 is configured to house only a portion of the table 107 when the table 107 is in a stowed position. For example, the carriage 113 and the table 107 may be configured so that the table 107 extends out of the carriage 113 when the table 107 is received in the carriage 113. In particular, the table 107 may be wider than the carriage 113, such as in the direction of travel of the carriage 113. In order to allow the carriage 113 to receive an article of vehicle furniture 103 that is larger, e.g., wider, than the carriage 113 itself, the carriage 113 may be provided with a slot 123 which allows the article of vehicle furniture 103 to be moved into the carriage 113.

In the arrangement shown in FIGS. 1a-1e, the table 107 is approximately twice as wide as the carriage 113, in the direction of travel of the carriage 113. However, the difference between the dimensions of the carriage 113 and the table 107 may be of any appropriate amount, depending on the requirements of the vehicle furniture system 101. Further, the carriage 113 may be configured to receive any appropriate portion of the table 107. For example, the carriage 113 may be configured to house only one side of the table 107, such as a left side of the table 107 as viewed in FIGS. 1a-1e. The vehicle furniture system 101 may be configured to allow the table 107 to extend beyond the maximum extent of travel of the carriage 113, as a result of the table 107 being of a larger size than the carriage 113.

The operation of the vehicle furniture system 101 will now be described with reference to FIGS. 1a-1e, which show the vehicle furniture system 101 in a variety of operational states. For example, FIG. 1a shows the table 107 of the vehicle furniture system 101 in a fully stowed state, FIGS. 1d and 1e show the table 107 of the vehicle furniture system 101 in a fully deployed state, whilst FIGS. 1b and 1c each show the vehicle furniture system 101 in an intermediate state. For the sake of explanation, the first door 109, which is shown on the left hand side of FIGS. 1a-1e, shall be referred to the front door, and the second door 111, which is shown on the right hand side of FIGS. 1a-1e, shall be referred to as the rear door, for example as if the doors 109, 111 were the side doors of a vehicle. As such, the vehicle furniture system 101 shown in FIGS. 1a-1e shows a table 107 carried by a carriage 113, the carriage 113 being mounted on rails 117 secured within an internal cavity 125 of the front door 107, so that the carriage 113 is able to carry the table 107 between forward and rearward positions within the front and/or rear doors 109, 111. However, it is understood the each of the doors 109, 111 may be positioned on any portion of the vehicle, and that the below described movements and operations are not limited to the directions stated.

In FIG. 1a, the table 107 is housed inside the carriage 113, which is positioned in the first position towards the front of the front door 109. Since the table 107 is larger than the carriage 113, the table 107 extends rearwards out of the carriage 113, and into a portion of the internal cavity 125 that is unoccupied by the carriage 113. When the vehicle furniture system 101 is in the fully stowed state, as shown in FIG. 1a, the carriage 113 and the table 107 are disposed entirely within the cavity 125 of the front door 109. As a result, the vehicle furniture system 101 does not affect the opening or the closing of the front door 109 when the table 107 is in a fully stowed position.

Figure 1B:
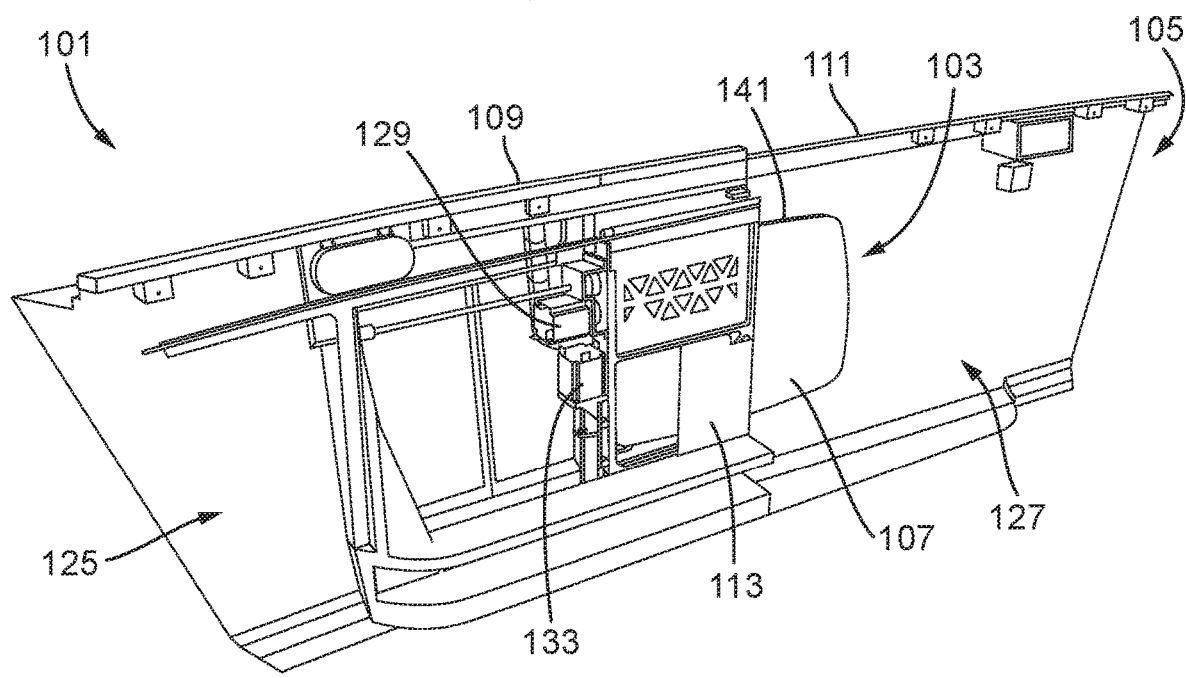
FIG. 1b is a perspective view of a vehicle furniture system shown in a further intermediate state.

In FIG. 1b, the carriage 113 has moved along the rails 117 to the second position, in which the carriage 113 is positioned towards the rear of the front door 109. The table 107 has not moved relative to the carriage 113 and the carriage is still disposed entirely within the cavity 125 of the front door 109. However, since the table 107 is larger than the carriage 113, the table 107 extends rearwards out of the carriage 113, and into an internal cavity 127 of the rear door 111. It can be seen, therefore, that when the carriage 113 is in the second position, the table 107 extends across the interface between the front and rear doors 109, 111.

In another arrangement (not shown), the vehicle furniture system 101 may be configured such that the carriage 113 is movable to a position where the carriage 113 is at least partially within the internal cavity 127 of the rear door 111. For example, the carriage 113 may be configured so that it extends beyond the maximum extent of travel of the rails 117, when the carriage 113 is in the second position.

A door panel of the rear door 111 may be configured to allow at least one of the front and rear doors 109, 111 to open and close when the table 107 is disposed at least partially within the internal cavity 127 of the rear door 111. For example, the door panel of the rear door 111 may comprise one or more openings configured to allow the rear door 111 to open and close without contacting the table 107.

The door panel of the front and rear doors 109, 111 may be configured to conceal the table 107, when it is disposed within at least one of the internal cavities 125, 127 of the doors 109, 111. As such, the vehicle furniture system 101 may be configured to move the table 107 within the vehicle body 105, e.g., within the front and rear doors 109, 111, so that it is not visible to an occupant of the vehicle.

In FIGS. 1a and 1b, the first and second positions of the carriage 113 are located towards the limits of movement allowed by the configuration of the rails 117. However, it is understood that the first and second positions may be any relative positions along the length of the rails 117. Further, in FIGS. 1a and 1b, the table 107 has not moved relative to the carriage 113 as a result of the carriage 113 moving between the first and second positions. However, in another arrangement (not shown), the position of the table 107 relative to the carriage 113 may change as the carriage 113 moves between the first and second positions.

In order to move the carriage 113 between the first and second positions, the vehicle furniture system 101 comprises an actuator 129, such as a carriage actuator, configured to push and pull the carriage 113 along the rails 117. In the arrangement shown in FIGS. 1a-1e, and the exploded view of FIG. 2, the actuator 129 comprises a worm drive mechanism 131. However, the actuator 129 may be any appropriate type of actuator configured to move the carriage 113 relative to the body portion 105 of the vehicle. In one arrangement, the vehicle furniture system 101 may be configured so that an occupant of the vehicle can move the carriage 113 manually. For example, the carriage 113 may comprise a handle extending through the body portion 105 of the vehicle, the handle allowing the occupant to push and pull the carriage 113 into one or more required positions.

Figure 1C:
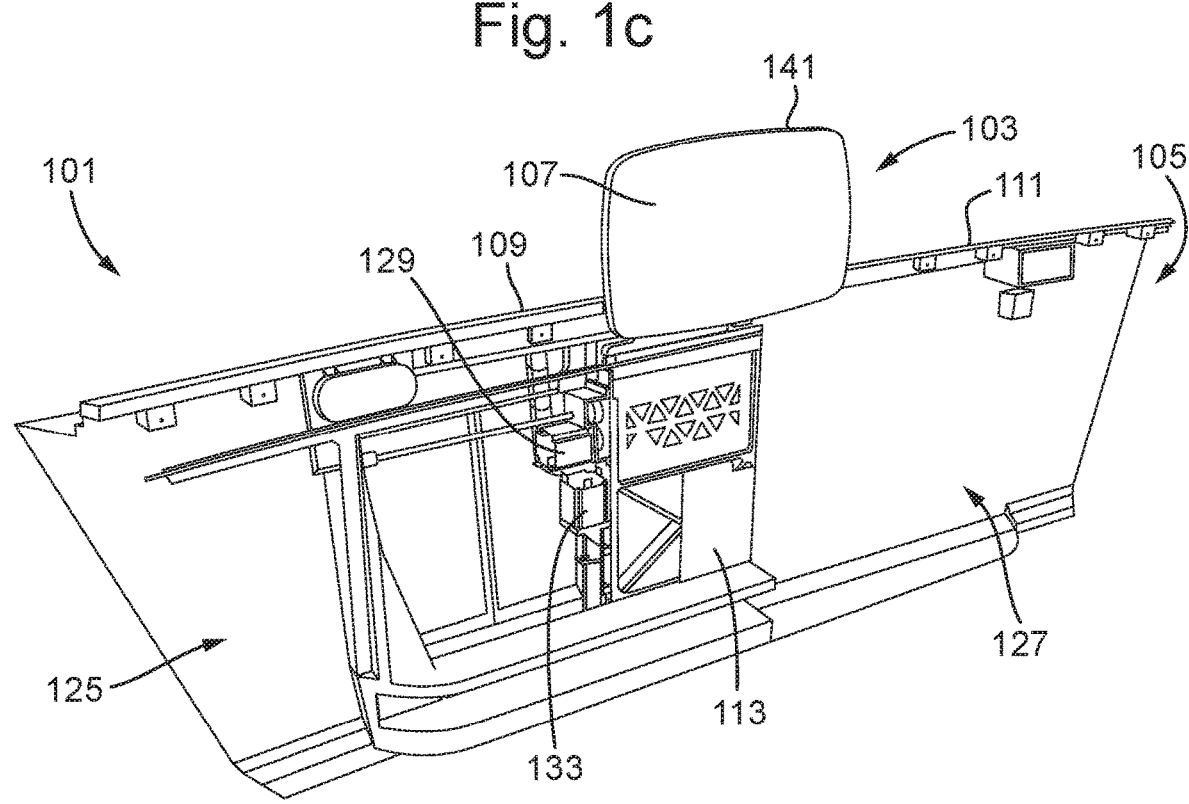
FIG. 1c is a perspective view of a vehicle furniture system in an intermediate state.
Figure 1D:
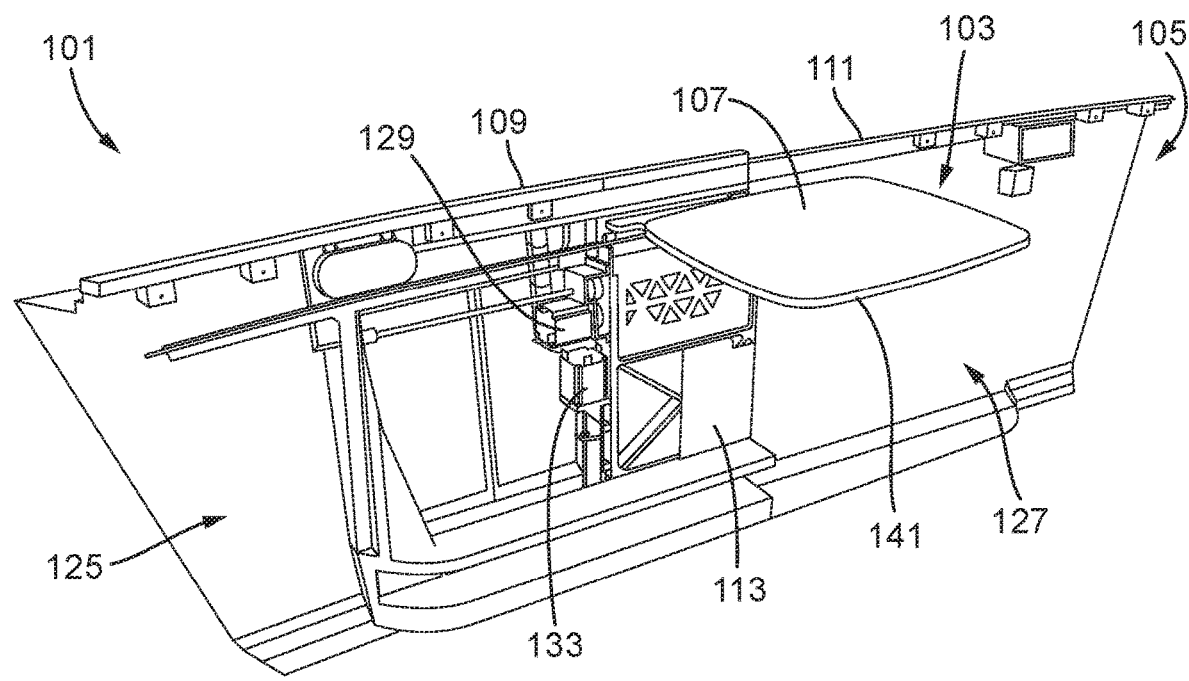
FIG. 1d is a perspective view of the vehicle furniture system shown in a fully deployed state.
Figure 1E:
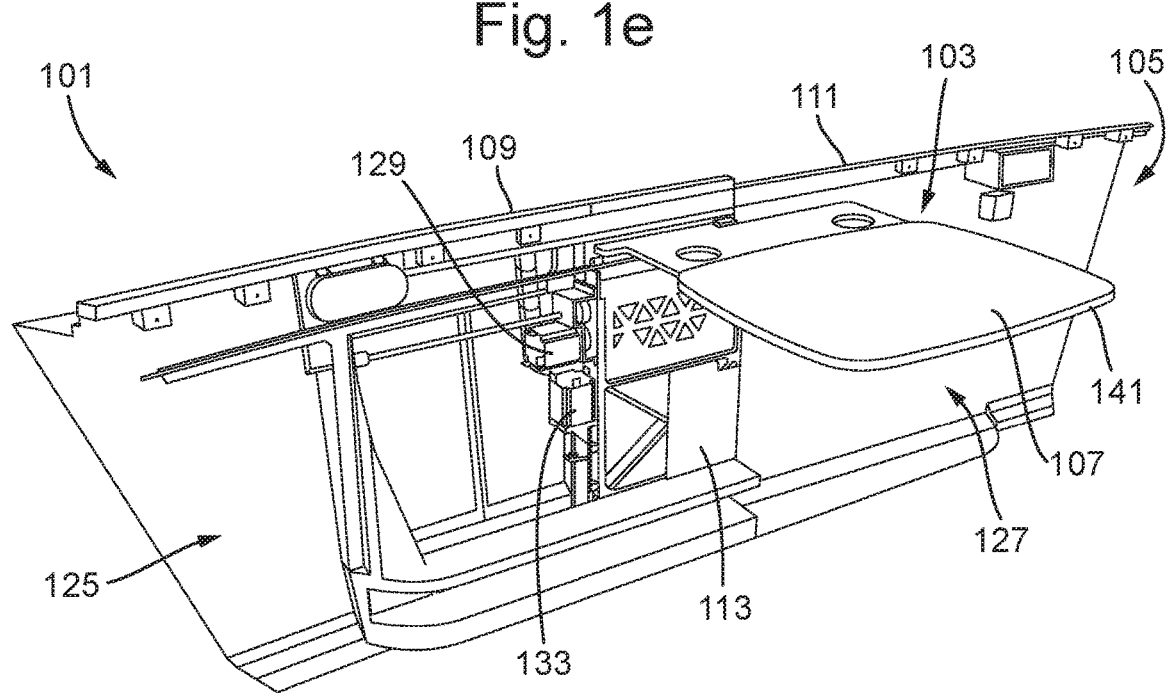
FIG. 1e is a perspective view of the vehicle furniture system shown in a further fully deployed state.

FIG. 1c shows the table 107 in a first deployed position. In order to move the table 107 relative to the carriage 113, the vehicle furniture system 101 comprises an actuator 133, such as a table actuator, configured to deploy the table 107 from the carriage 113. The actuator 133 used to move the table 107 may be of a similar type to the actuator 129 used to move the carriage. However, a single actuator may be used to move the table 107 and the carriage 113.

The actuator 133 is coupled to the carriage 113 so that the actuator 133 moves with the carriage 113, for example when the actuator 129 is operated. However, the actuator 133 may be fixed relative to the vehicle body 105, or may be moveably coupled to the vehicle body 105 by virtue of any appropriate mounting arrangement.

In the arrangement shown in FIGS. 1a-1e, the actuator 133 is coupled to a belt drive 135, which in turn is coupled to a worm drive mechanism 137 that is configured to drive the table 107 in a substantially vertical manner, so as to deploy and retract the table 107 into and out of the carriage 113. The worm drive mechanism 137 is coupled to a support shoulder 139 of the table 107 such that operation of the actuator 133 controls the position of the table 107 in a substantially vertical direction. The support shoulder 139 is coupled to the worm drive mechanism 137 by virtue of a guide member 145, e.g., a spindle, which is fixed in relation to the worm drive mechanism 137 such that the guide member 145 follows the worm drive mechanism 137 as it is operated by the actuator 133. The support shoulder 139 is rotationally coupled to the guide member 145 to allow the table 107 to rotate about the guide member 145, as the table 107 is raised or lowered relative to the carriage 113.

The guide member 145 comprises at least one roller 147 that is configured to rotate about the guide member 145 and engage a bearing surface 149 of the carriage 113, which is configured to support the guide member 145 during the deployment of the table 107. As best seen in the detailed view of FIG. 3, the roller 147 and the bearing surface 149 each comprise a plurality of ribs configured to engage each other. In this manner, the vehicle furniture system 101 comprises a geared coupling between the guide member 145 and the carriage 113. Such an arrangement is beneficial, as it prevents the guide member 145, and thus the table 107, from slipping relative to the carriage 113 as the table 107 is deployed from and retracted into the carriage 113. In one arrangement, the geared coupling between the guide member 145 and the carriage 113 may be driven by another actuator to cause the table 107 to move relative to the carriage 113.

In the arrangement shown in FIG. 3, the guide member 145 comprises a single roller 147 having two discrete ribbed portions, separated by a smooth portion having no ribs. This arrangement is beneficial as it allows for articles, such as electrical cables, to pass between the guide member 145 and the support shoulder 139 of the table 107.

When the table 107 is stowed within the front door 109 and/or the rear door 111, the support shoulder 139 of the table is located towards the bottom of the carriage 113, such that the support shoulder 139 is proximate to the lower rail of the two rails 117. In this position, the roller 147 is engaged with a lower portion of the bearing surface 149 of the carriage 113.

Upon operation of the actuator 133, the table 107 is moved, e.g., translated, upwards through the carriage 113 such that a leading edge 141 of the table 107 engages the ramped surfaces 143 of the carriage 113, which can be seen more clearly in FIG. 3. In the arrangement shown in FIG. 3, the carriage 113 comprises two ramped surfaces 143 disposed either side of opening 119 into the carriage 113. However, the carriage 113 may comprise any appropriate number of ramped surfaces 143, such as a single ramped surface 143, which may be disposed centrally with respect to the front and rear edges of the carriage 113.

The ramped surfaces 143 are configured to direct the table 107 as it is deployed from the doors 109, 111. For example, the ramped surfaces 143 are curved towards an interior side of the doors 109, 111, so that the table 107 is caused to lean into the passenger compartment of the vehicle as the leading edge 141 of the table 107 is pushed along the ramped surfaces 143. As a result, the table 107 is deployed into the passenger compartment of the vehicle in an arcuate manner, i.e., the leading edge 141 of the table 107 follows a curved path as the table 107 is deployed from within the doors 109, 111.

In FIG. 1c, the table 107 is shown in an intermediate state of deployment. For example, the support shoulder 139 has been moved upwards by approximately eighty to ninety percent (80-90%) of the total travel allowed for by the configuration of the vehicle furniture system 101. In such a position, the table 107 has become disengaged from the ramped surfaces 143 and is supported from the underside of the table 107 by a support member 151. In an assembled configuration, the support member 151 is offset from the bearing surface 149 of the carriage 113 by a distance approximately equal to the depth of the support shoulder 139 of the table 107. In this manner, as the table 107 is deployed from the doors 109, 111, the table 107 becomes cantilevered over the support member 151, the angular orientation of the table 107 with respect to the inner surface of the doors 109, 111 being controlled by the interaction between the roller 147 and the bearing surface 149, as the table 107 pivots about the support member 151.

The support member 151 may be provided on the carriage 113 and/or on any other part of the vehicle furniture system 101. The support member 151 may be positioned so as to support the table 107 at a point where the leading edge 141 of the table 107 has just disengaged the ramped surfaces 143 as the table 107 deploys from the door and leans into the passenger compartment. The vehicle furniture system 101 may be configured such that the table 107 is in engagement with only one of the ramped surfaces 143 and the support member 151 to avoid the table 107 from becoming jammed as it is deployed from or retracted into the doors 109, 111.

FIGS. 1d and 1e show the table 107 deployed into a usable position, i.e., in a position in which the table 107 is level. Importantly, the actuator 133 is configured to operate the worm drive mechanism 137 until the table has reached a level position. The vehicle furniture system 101 may comprise one or more sensors configured to determine the angular orientation of the table 107 and/or the vehicle. In this manner, the vehicle furniture system 101 may be configured to determine when the table is in a level position, and adjust the angular orientation of the table 107 when the vehicle is on uneven ground, for example. In another arrangement, the vehicle furniture system 101 may comprise a further actuator configured to adjust, e.g., independently adjust, the angular orientation of the table 107, when the table 107 is deployed from the doors 109, 111. In one arrangement, the vehicle furniture system 101 may have an active stability control system configured to control and orientate the table 107, for example as the vehicle pitches and rolls.

FIG. 1e shows a further operational state of the vehicle furniture system 101 in which the table 107 has been extended in a direction away from the doors 109, 111. For example, the table 107 may comprise a table support structure 153 and a table top 155 moveably coupled to the table support structure 153. In the arrangement shown in FIGS. 1*a*-3, the table support structure 153 is formed integrally with the table support shoulder 139. However, the table support structure 153 may be provided separately from the table support shoulder 139, such that the table support structure 153 and the table top 155 may be assembled and disassembled from the vehicle furniture system 101. This is advantageous as it allows the table 107 to be serviced, for example where the table contains one or more electronic components, such as screens and interfaces.

Figure 2:
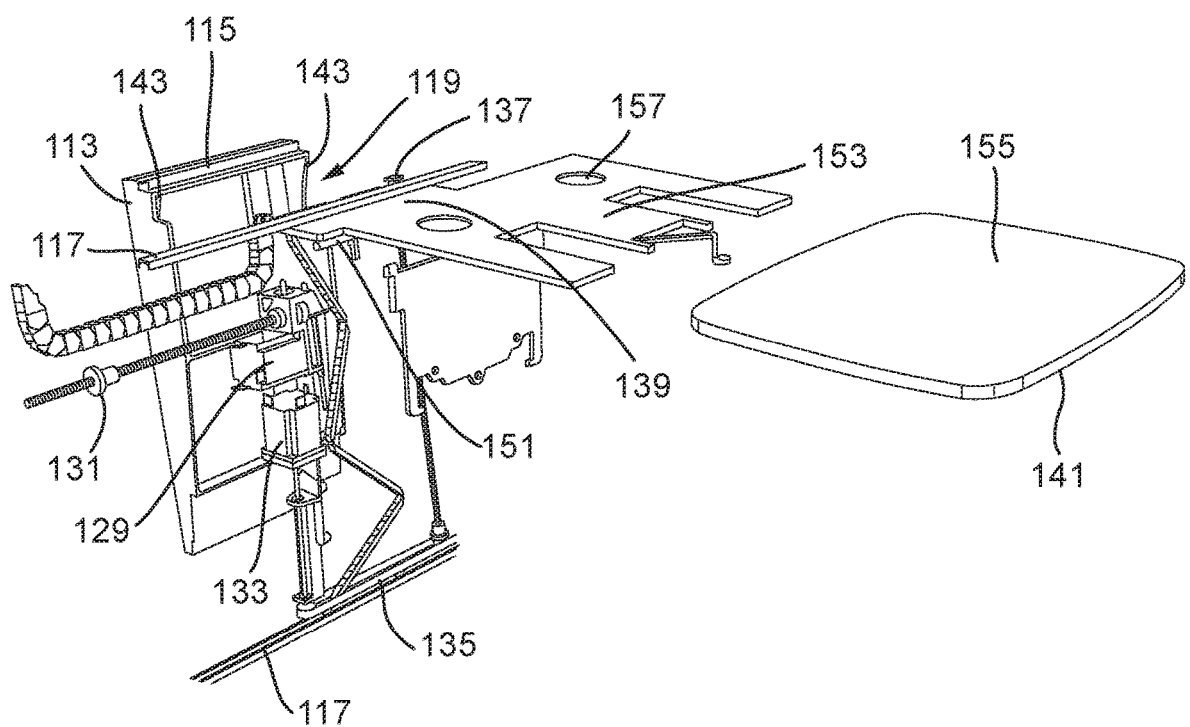
FIG. 2 is an exploded view of the vehicle furniture system.

As shown in FIGS. 1*e*, 2 and 3, the table support structure 153 comprises at least one opening 157 that is covered when the table 107 is in the un-extended state of FIG. 1*d*, and is uncovered when the table top 155 is moved relative to the table support structure 153, as shown in FIG. 1*e*. Such an opening 157 may be used as a cup holder, and/or as a fixing point/charging point for one or more vehicle accessories.

One advantage of the vehicle furniture system 101 shown in FIGS. 1*a*-1*e*, is that the rear door 111 of the vehicle may be opened when the table 107 is deployed from vehicle body 105. Further, the door panel of the front door 109 and/or the door panel of the rear door 111 may be provided with a slot that allows the table 107 to be moved forwards and/or rearwards whilst the table 107 is deployed from the doors 109, 111. For example, the door panel of the front door 109 may comprise a first slot and the door panel of the rear door 111 may comprise a second slot, the first and second slots cooperating to receive the table 107 when the carriage 113 is in the second position. However, at least one of the first and second slots may be configured to allow the carriage 113 to move between the first and second positions while the table 107 is at least partially deployed. This is advantageous as it allows for the table 107 to be moved to a position where the front door 109 can be opened and closed while the table 107 is at least partially deployed.

In summary, the present disclosure is advantageous as it allows for an article of vehicle furniture to be stowed in one location within the vehicle body and deployed from another position within the vehicle body. This is particularly useful for a modern vehicle, where the passenger compartment of the vehicle may be reconfigured between, or even during, journeys. For example, the passenger compartment of a vehicle may have a front seat provided next to a front door, and a rear seat provided next to a rear door. As such, it may not be possible to stow and deploy a table from a position in between the front and rear doors, as a result of the operation of the doors themselves and/or the location of one or more supporting structure of the vehicle body, such as a B-pillar. Further, where the front seat and/or the rear seat of the vehicle are moveable within the passenger compartment, an occupant may wish to reconfigure the vehicle furniture depending on the requirements of the journey. The present disclosure is advantageous as it allows for the article of vehicle furniture, such as a table, to be moved within a body portion of the vehicle body, such as within a door cavity, to allow for other articles of vehicle furniture, such as seat, to be moved without obstruction within the passenger compartment.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle furniture system comprising:
an article of furniture;
a carriage configured to carry the article of furniture between first and second positions within a body portion of a vehicle when the carriage is coupled to the body portion of the vehicle; and
a first actuator configured to deploy the article of furniture from the carriage when the carriage is in at least one of the first and second positions.

2. The vehicle furniture system according to claim 1, wherein the carriage and the article of furniture are moveably coupled.

3. The vehicle furniture system according to claim 1, wherein the carriage comprises a ramped surface configured to direct the article of furniture as the article of furniture deploys from the carriage, and wherein operation of the first actuator causes the article of furniture to engage the ramped surface.

4. The vehicle furniture system according to claim 1 further comprising a geared coupling between the article of furniture and the carriage.

5. The vehicle furniture system according to claim 1, wherein the vehicle furniture system comprises a second actuator configured to move the carriage between first and second positions within a body portion of a vehicle, and a third actuator configured to adjust orientation of the article of furniture when deployed from the body portion of the vehicle.

6. The vehicle furniture system according to claim 1, wherein the body portion of the vehicle comprises a vehicle first door.

7. The vehicle furniture system according to claim 6, wherein the carriage is configured to move within a cavity of the first door, and the first door is configured to house the article of furniture when the carriage is in the first position.

8. The vehicle furniture system according to any of claim 6, wherein the body portion of the vehicle comprises a second door, the first door and the second door cooperating to house the article of furniture when the carriage is in the second position.

9. The vehicle furniture system according to claim 8, wherein the first door and the second door each comprise a slot, the slot of the first door and the slot of the second door cooperating to receive the article of furniture when the carriage is in the second position and the article of furniture is in an at least partially deployed state.

10. The vehicle furniture system according to claim 8, wherein the article of furniture extends across an interface between the first and second doors when the carriage is in the second position and the article of furniture is in an at least partially deployed state.

11. The vehicle furniture system according to claim 8, wherein at least one of the first door and the second door can be opened and closed when the article of furniture is in a deployed state.

12. The vehicle furniture system according to claim 1 further comprising a support member configured to at least partially support the article of furniture when in a deployed state.

13. The vehicle furniture system according to claim 1, wherein the support member is coupled to the carriage.

14. The vehicle furniture system according to claim 1, wherein the support member is deployable from the article of furniture.

15. The vehicle furniture system according to claim 1, wherein the article of furniture is movable between a contracted state and an expanded state when the article of furniture is in a deployed state.

16. The vehicle furniture system according to claim 1, wherein the article of furniture comprises a table.

17. The vehicle furniture system according to claim 1, wherein the article of furniture comprises a seat.

18. The vehicle furniture system according to claim 1, wherein the vehicle furniture system is located on a vehicle.

19. A vehicle comprising:
- a body portion;
- an article of furniture;
- a carriage configured to carry the article of furniture between first and second positions within the body portion when the carriage is coupled to the body portion; and
- a first actuator configured to deploy the article of furniture from the carriage when the carriage is in at least one of the first and second positions.

20. A method of operating a vehicle furniture system having an article of furniture and a carriage configured to carry the article of furniture between first and second positions within a body portion of a vehicle when the carriage is coupled to the body portion of the vehicle, comprising:
- providing a first actuator configured to deploy the article of furniture from the body portion when the carriage is in at least one of the first and second positions;
- moving the carriage to one of the first position and the second position within the body portion of a vehicle; and
- deploying the article of furniture from the body portion.

* * * * *